United States Patent
Chang (10) Patent No.: US 10,303,584 B2
(45) Date of Patent: May 28, 2019

(54) METHOD FOR MESSAGE-PROCESSING

(71) Applicant: AMTRAN TECHNOLOGY CO., LTD, New Taipei (TW)

(72) Inventor: Ke-Fan Chang, New Taipei (TW)

(73) Assignee: AMTRAN TECHNOLOGY CO., LTD., New Taipei (TW)

( * ) Notice: Subject to any disclaimer, the term of this patent is extended or adjusted under 35 U.S.C. 154(b) by 2 days.

(21) Appl. No.: 15/597,114

(22) Filed: May 16, 2017

(65) Prior Publication Data

US 2018/0276107 A1    Sep. 27, 2018

(30) Foreign Application Priority Data

Mar. 23, 2017   (TW) .............................. 106109845 A (51) Int. Cl.
| | |
|---|---|
| *G06F 9/44* | (2018.01) |
| *G06F 9/445* | (2018.01) |
| *G06F 9/45* | (2006.01) |
| *G06F 11/36* | (2006.01) |
| *H04L 12/58* | (2006.01) |

(52) U.S. Cl.
CPC ...... *G06F 11/3664* (2013.01); *G06F 11/3672* (2013.01); *H04L 51/30* (2013.01)

(58) Field of Classification Search
CPC ............. G06F 11/3672; G06F 11/3668; G06F 11/3676; G06F 11/3664–3676; H04L 51/30
See application file for complete search history.

(56) References Cited

U.S. PATENT DOCUMENTS

| | | | | |
|---|---|---|---|---|
| 9,552,268 | B2* | 1/2017 | Raddino | ................. H04L 43/18 |
| 9,569,339 | B1* | 2/2017 | Villalobos | ........... G06F 11/3644 |
| 9,667,573 | B2* | 5/2017 | Malnati | ................... H04L 51/02 |
| 9,811,442 | B2* | 11/2017 | Doi | ..................... G06F 11/3636 |

(Continued)

OTHER PUBLICATIONS

Qiang Yue, A Model of Message-based Debugging Facilities for Web or Grid Services, 2009, pp. 155-162. https://ieeexplore.ieee.org/stamp/stamp.jsp?tp=&arnumber=5190745 (Year: 2009).*

(Continued)

*Primary Examiner* — Mongbao Nguyen
(74) *Attorney, Agent, or Firm* — Maschoff Brennan (57) ABSTRACT

A method for message-processing adapted to a server and a device under test is disclosed. The device provides a plurality of messages and the server receives the plurality of messages through a first interface. In the method, receive a plurality of first predetermined triggering conditions. Each first predetermined triggering condition has a first character string. Then, read the plurality of messages sequentially. Then, determine whether at least one of the plurality of first predetermined triggering conditions is enabled. Check whether the plurality of messages contains the first character string of the enabled one of the plurality of first predetermined triggering conditions sequentially. Then, form a first filtering group having contents comprising part of the plurality of messages, wherein said part of the plurality of messages has the first character string of the enabled one of the plurality of first triggering conditions. Display the contents of the first filtering group.

6 Claims, 6 Drawing Sheets

(56) References Cited

U.S. PATENT DOCUMENTS

| | | | |
|---|---|---|---|
| 2003/0037257 A1 | 2/2003 | Wang | |
| 2006/0174225 A1* | 8/2006 | Bennett | G06F 11/362 717/124 |
| 2007/0266289 A1* | 11/2007 | Yang | G06F 11/2294 714/742 |
| 2010/0268991 A1* | 10/2010 | Birch | G06F 11/2215 714/32 |
| 2012/0005547 A1 | 1/2012 | Chang et al. | |
| 2012/0272216 A1* | 10/2012 | Bates | G06F 11/362 717/125 |
| 2013/0007716 A1* | 1/2013 | Bates | G06F 11/362 717/125 |
| 2013/0031416 A1* | 1/2013 | Buckhurst | G06F 11/3664 714/38.1 |
| 2014/0059391 A1* | 2/2014 | Chan | G06F 11/2268 714/45 |
| 2014/0089354 A1* | 3/2014 | Gonsalves | H04M 3/2218 707/812 |
| 2014/0325484 A1* | 10/2014 | Gillaspie | G06F 11/3684 717/124 |
| 2014/0359362 A1* | 12/2014 | Lu | G06F 11/3692 714/33 |
| 2015/0040108 A1* | 2/2015 | Kushida | G06F 11/3612 717/131 |
| 2015/0149834 A1* | 5/2015 | Raddino | H04L 43/18 714/46 |
| 2015/0234724 A1* | 8/2015 | Hu | G06F 11/26 714/37 |
| 2015/0363215 A1* | 12/2015 | Versteeg | G06F 11/3664 703/23 |
| 2016/0080243 A1* | 3/2016 | Kodama | H04L 41/0806 370/252 |
| 2016/0110359 A1* | 4/2016 | Underwood | G06F 11/3476 707/643 |
| 2016/0269270 A1* | 9/2016 | Maag | H04L 43/18 |
| 2016/0323207 A1* | 11/2016 | Malnati | H04L 41/06 |
| 2017/0168917 A1* | 6/2017 | Doi | G06F 11/3636 |
| 2017/0329696 A1* | 11/2017 | Bitoun | G06F 11/3612 |
| 2017/0351559 A1* | 12/2017 | Rajagopal | G06F 11/079 |
| 2018/0089071 A1* | 3/2018 | Keskitalo | G06F 11/3684 |

OTHER PUBLICATIONS

Qiang Yue, An Approach to Debugging Grid or Web Services, 2007, pp. 1-8. https://ieeexplore.ieee.org/stamp.jsp?tp=&arnumber=4279616 (Year: 2007).*

Chao Jin, A Scalable Parallel Debugging Library with Pluggable Communication Protocols, 2012, pp. 1-8. https://ieeexplore.ieee.org/document/6217429 (Year: 2012).*

XupingTu, Meld: A Real-time Message Logic Debugging System for Distributed Systems, 2010, pp. 59-66. https://ieeexplore.ieee.org/stamp/stamp.jsp?tp=&arnumber=5708554 (Year: 2010).*

Taiwanese Office Action issued in corresponding application TW 106109845, dated May 29, 2018.

* cited by examiner

| Enabled | First triggering condition | First character string |
|---|---|---|
| ✓ | TC1_1 | CS1_1 |
| ☐ | TC1_2 | CS1_2 |
| ☐ | TC1_3 | CS1_3 |
| ☐ | TC1_4 | CS1_4 |

| Enabled | Second triggering condition | Second character string |
|---|---|---|
| ☐ | TC2_1 | CS2_1 |
| ☑ | TC2_2 | CS2_2 |
| ☐ | TC2_3 | CS2_3 |
| ☐ | TC2_4 | CS2_4 |

FIG. 8

METHOD FOR MESSAGE-PROCESSING

CROSS-REFERENCE TO RELATED APPLICATIONS

This non-provisional application claims priority under 35 U.S.C. § 119(a) on Patent Application No(s). 106109845 filed in Taiwan, R.O.C. on Mar. 23, 2017, the entire contents of which are hereby incorporated by reference.

TECHNICAL FIELD

The disclosure relates to a method for message-processing, more particularly to a method for message-processing for filtering and monitoring messages.

BACKGROUND

Manufacturers perform a plurality of tests for their products during the process of product manufacturing in order to check if those products contain one or more bugs. Thereby, the one or more bugs would be fixed. For achieving this, general speaking, one or more devices under test are connected to a computer server through one or more debugging interfaces, and tool software installed in the computer server receives feedback messages from the one or more devices under test. Thereby, engineers or technicians are able to observe some specific information related to the one or more devices under test, such as statuses of internet connection. However, more functions the one or more devices have, more feedback messages would be generated. In fact, it is difficult for engineers or technicians to find out specific problems to be observed from a huge amount of feedback messages.

On the other hand, generally one or more commands are given by a computer server for performing a variety of testing procedures in order to find out some problems or bugs of one or more device under test. However, some specific testing procedures need lots of time for operation. In the process of operations of those specific testing procedures, it is necessary for engineers or technicians to occasionally observe statuses and outputted messages of one or more device under test, so that the engineers or the technicians could immediately know whether the one or more devices under test have bugs or problems. Thereby, further relative commands or actions could be provided for collecting more information to clarify reasons that the one or more device under test have bugs or problems. If engineers or technicians are not in the place where the one or more devices under test are tested when testing procedures are performed on the one or more devices under test, the engineers or the technicians have to check afterwards to know about bugs or problems of the one or more devices under test.

SUMMARY

A method for message-processing is disclosed according to one embodiment of the present disclosure. The method for message-processing is adapted to a computer server and a device under test. The device provides a plurality of messages and the computer server receives the plurality of messages through a first interface. In the method, first of all, receive a plurality of first predetermined triggering conditions of the messages, with each first predetermined triggering condition having a first character string. Then, read the plurality of messages sequentially. Then, determine whether at least one of the plurality of first predetermined triggering conditions is enabled. Check whether the plurality of messages contains the first character string of the enabled one of the plurality of first predetermined triggering conditions sequentially. Then, form a first filtering group having contents comprising a part of the plurality of messages, wherein said part of the plurality of messages has the first character string of the enabled one of the plurality of first predetermined triggering conditions. Display on a display screen the contents of the first filtering group.

A method for message-processing is disclosed according to another embodiment of the present disclosure. The method for message-processing is adapted to a computer server and a device under test. The device provides a plurality of messages and the computer server receives the plurality of messages through a first interface. In the method, first of all, receive a plurality of second predetermined triggering conditions, with each second predetermined triggering condition having a second character string. Then, sequentially read the plurality of messages. Then, determine whether at least one of the plurality of second predetermined triggering conditions is enabled. Then, determine whether the plurality of messages has the second character string of the enabled one of the plurality of second predetermined triggering conditions. Then, send a first testing command for executing a first debugging procedure when it is determined that at least one of the plurality of messages has the second character string of the enabled one of the plurality of second predetermined triggering conditions. Then, generate first testing information according to the first debugging procedure, wherein the first testing information is configured to indicate a first debugging result related to the second character string of the enabled one of the plurality of second predetermined triggering conditions. Then, send the first testing information to a client.

A method for message-processing is disclosed according to one embodiment of the present disclosure. The method for message-processing is adapted to a computer server and a device under test. The device provides a plurality of messages and the computer server receives the plurality of messages through a first interface. In the method, first of all, respectively receive a plurality of first predetermined triggering conditions and a plurality of second predetermined triggering conditions, with each first predetermined triggering condition having a first character string and each second predetermined triggering condition having a second character string. Then, sequentially read the plurality of messages. Then, respectively determine whether at least one of the plurality of first predetermined triggering conditions is enabled and whether at least one of the plurality of second predetermined triggering conditions is enabled. Then, sequentially check whether the plurality of messages has the first character string of the enabled one of the plurality of first predetermined triggering conditions for forming a first filtering group and displaying contents of the first filtering group, wherein the contents of the first filtering group comprises a part of the plurality of messages, and said part of the plurality of messages has the first character string of the enabled one of the plurality of first predetermined triggering conditions. Then, determine whether the plurality of messages has the second character string of the enabled one of the plurality of second predetermined triggering conditions. Then, send at least one first testing command for executing a first debugging procedure so that first testing information is generated when it is determined that at least one of the plurality of messages has the second character string of the enabled one of the plurality of second predetermined triggering conditions, wherein the first information is configured to indicate a first debugging result related to the second character string corresponding to the enabled one of the plurality of second predetermined triggering conditions. Then, send the first testing information to a client.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
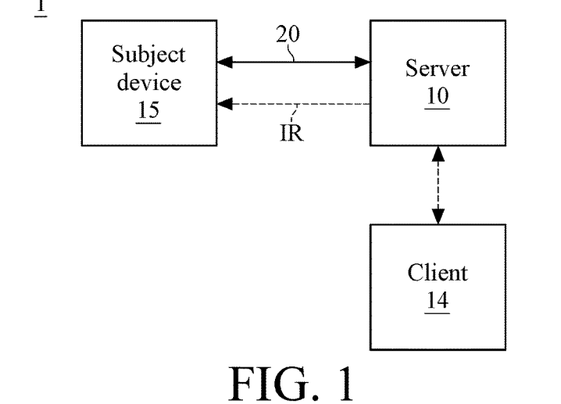
FIG. 1 is a block diagram of a message-processing system according to one embodiment of the present disclosure.
Figure 2:
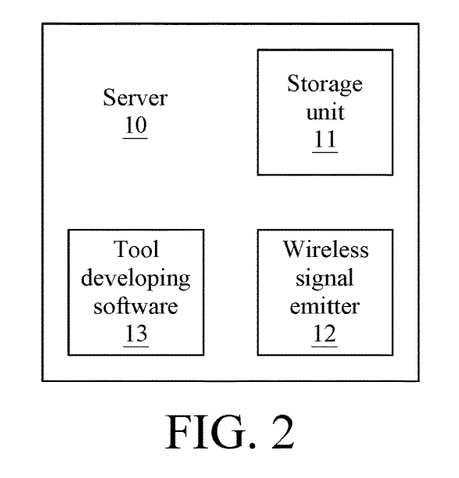
FIG. 2 is a schematic diagram of inner structure of the computer server according to one embodiment of the present disclosure.
Figure 3:
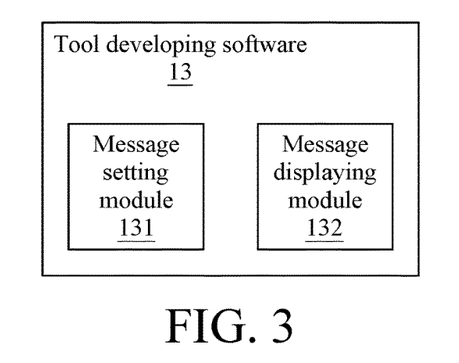
FIG. 3 is an inner schematic diagram of tool developing software according to one embodiment of the present disclosure.

Please refer to FIG. 1, which is a block diagram of a message-processing system according to one embodiment of the present disclosure. As shown in FIG. 1, a message-processing system 1 includes a computer server 10, a subject device 15, which is a subject device and a client 14. The message-processing system 1 is adapted to the method for message-processing disclosed in the present disclosure. In an example, the computer server 10 is a computer system or a host, and the subject device 15 is a developing device or a developing machine, such as a LCD TV, a display, an audio system, etc. The first interface 20 is a debugging interface configured to transmit information or data. For example, the computer server 10 and the subject device 15 are connected through an universal asynchronous receiver/transmitter (UART), an universal serial bus or a wired or wireless Ethernet, etc. Please refer to FIG. 1 and FIG. 2. FIG. 2 is a schematic diagram of inner structure of the computer server according to one embodiment of the present disclosure. In practice, as shown in FIG. 1 and FIG. 2, in the process of development, in order to test the subject device 15, relative technical members may connect subject device 15 to the computer server 10 through the first interface 20. By setting tool developing software 13 installed in the computer server 10, one or more commands may be given to the subject device 15, and messages outputted by the subject device 15 after executing the one or more commands are read. Please further refer to FIG. 3, which is an inner schematic diagram of the tool developing software according to one embodiment of the present disclosure. As shown in FIG. 3, the tool developing software 13 installed in the computer server 10 includes a message setting module 131 is provided to allow the client 14 to set up one or more predetermined triggering conditions and character strings through a window interface. The tool developing software 13 further includes a message displaying module 132 configured to display the relative messages generated by the subject device 15 according to the received predetermined triggering conditions and character strings.

Figure 4:
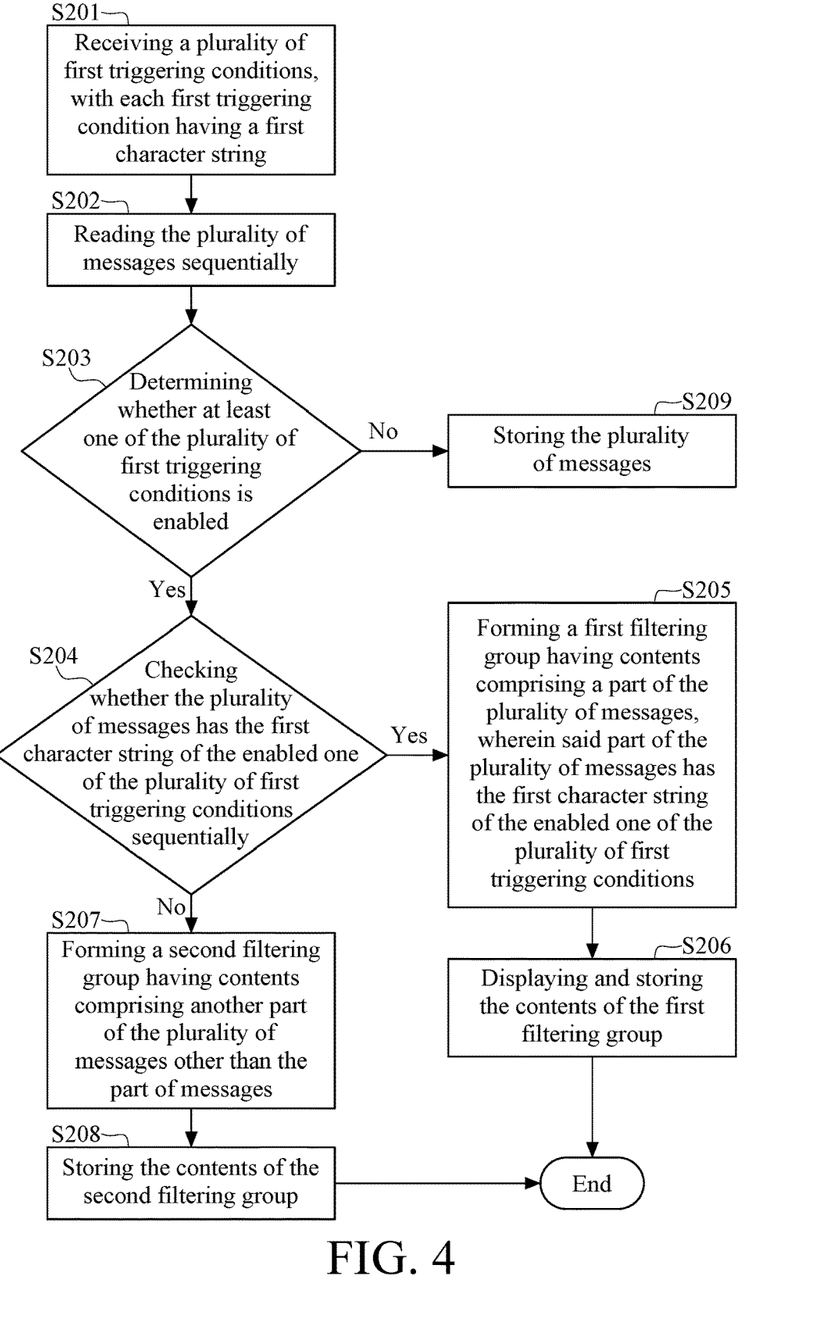
FIG. 4 is a flow chart of a method for message-processing according to one embodiment of the present disclosure.
Figure 5:
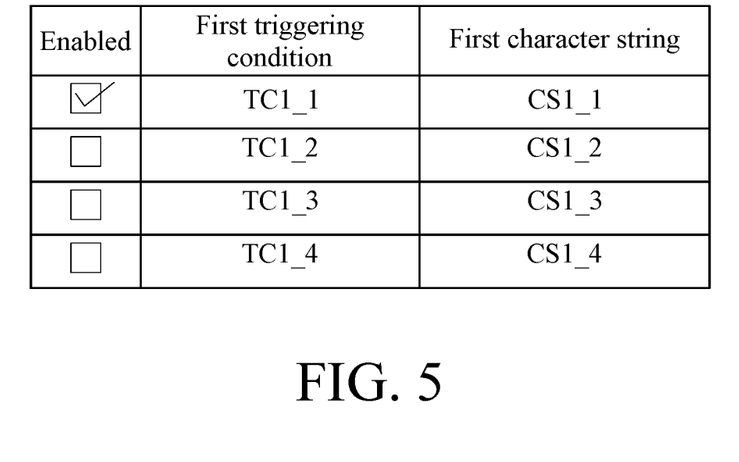
FIG. 5 is a schematic diagram of message setting window according to one embodiment of the present disclosure.

Please refer to FIG. 4 and FIG. 5. FIG. 4 is a flow chart of a method for message-processing according to one embodiment of the present disclosure. FIG. 5 is a schematic diagram of message setting window according to one embodiment of the present disclosure. As shown in FIG. 4 and FIG. 5, in step S201, first of all, a plurality of first predetermined triggering conditions TC1_1-TC1_4, set up by the client 14, is received by the message setting window provided by the message setting module 131 of the tool developing software 13 installed in the computer server 10. Each first predetermined triggering condition has a first character string. As shown in the embodiment of FIG. 5, the first predetermined triggering condition TC1_1 has a first character string CS1_1, the first predetermined triggering condition TC1_2 has a first character string CS1_2, the first predetermined triggering condition TC1_3 has a first character string CS1_3 and the first predetermined triggering condition TC1_4 has a first character string CS1_4. In one example, the first predetermined triggering condition represents a status of internet connection of the subject device 15 and its first character string can be "network". In practice, the members of the client 14 select one or more first predetermined triggering conditions among a plurality of first predetermined triggering conditions to be enabled in advanced in the message setting window of the message setting module 131 according to specific messages to be observed. After completing the aforementioned preparation, in the following step S202, the computer server 10 sequentially read messages provided by the subject device 15 through the first interface 20. Specifically, the tool developing software 13 installed in the computer server 10 may give some commands, so that the subject device 15 sends back a plurality of messages to the computer server 10 after executing those given commands, with said plurality of messages related to the subject device 15. The plurality of messages related to the subject device 15 is configured to be provided to the members of the client 14 for observing and for being stored in a storage unit 11 of the computer server 10. In one example, the storage unit 11 could be a non-volatile memory. At this time, in step S203, the computer server 10 determines whether at least one of the plurality of first predetermined triggering conditions TC1_1-TC1_4 is enabled.

As shown in FIG. 5, since the first predetermined triggering condition TC1_1 is enabled, in step S204, the computer server 10 sequentially check whether the read messages have the first character string CS1_1 of the first predetermined triggering condition TC1_1. If the message (s) among the read messages has the first character string CS1_1 of the first predetermined triggering condition TC1_1, then in step S205, the computer server 10 collects the message(s) having the first character string CS1_1 of the first predetermined triggering condition TC1_1, and groups them as a first filtering group. The contents of the first filtering group include the message(s) having the first character string of the enabled one of the plurality of first predetermined triggering conditions. In this embodiment, only one first predetermined triggering condition is enabled. However, in other embodiments, more than one first predetermined triggering condition may be enabled.

Figure 6:
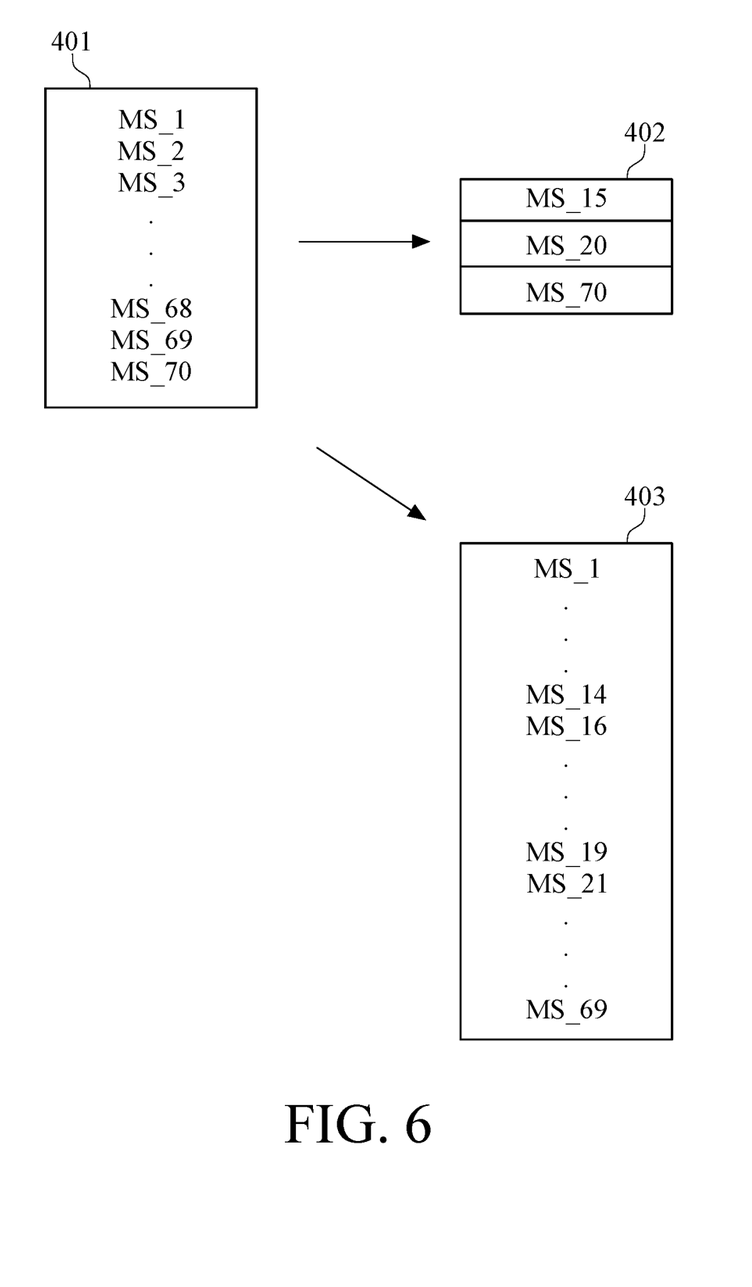
FIG. 6 is a schematic diagram of message-processing according to one embodiment of the present disclosure.

A practical example is used for illustrating the steps of message-processing. Please further refer to FIG. 6, which is a schematic diagram of message-processing according to one embodiment of the present disclosure. As shown in FIG. 6, the message frame 401 includes a plurality of messages MS_1-MS_70 provided by the subject device 15. When the computer server 10 sequentially reads the plurality of messages MS_1-MS_70 from the subject device 15, the computer server 10 sequentially checks whether the plurality of messages MS_1-MS_70 has the first character string of the enabled one of the first predetermined triggering conditions so that the plurality of messages are grouped. The way to group the plurality of messages is that extract one or more messages having the first character string of the enabled first predetermined triggering condition out of the plurality of messages, and then the extracted one or more messages are displayed via a displaying screen (e.g. window screen) of the message displaying module 132 and formed as the first filtering group 402. In this example, since the messages MS_15, MS_20 and MS_70 have the first character string CS1_1 of the first predetermined triggering condition TC1_1, the messages MS_15, MS_20 and MS_70 are extracted out of the plurality of messages MS_1-MS_70 to form the first filtering group 402 shown in FIG. 6.

After the computer server 10 sequentially read a plurality of messages MS_1-MS_70 from the subject device 15, in step S206, the contents of the first filtering group 402 formed according to the steps of aforementioned message processing would be stored in the storage unit 11 of the computer server 10 and displayed in the displaying screen of the message displaying module 132 of the computer server 10. In general, in order to find information to be observed, engineers or technicians have to open the files stored with feedback messages by executing other software tools. It is complicated and inconvenient for operations. The method for message-processing of the present disclosure directly displays the messages to be observed. Thereby, engineers or technicians are able to observe specific messages without executing other software to open the files with feedback messages, so that the convenience of operation can be achieved.

In other words, through the aforementioned method for message-processing, relative technical members are able to obtain specific information to be observed quickly without browsing the plurality of messages MS_1-MS_70 one by one. Therefore, the burden of observing messages of the relative technical members is reduced, time spent on looking for specific messages is reduced, and mistakes of human reading may be avoided. In one embodiment, as shown in FIG. 4, the method for message-processing further includes step S207 and S208. In step S207, a second filtering group is formed and the contents of the second filtering group include messages other than the messages of the first filtering group. In step S208, the contents of the second filtering group are stored in the storage unit 11. More specifically, the computer server 10 groups a part of the read plurality of messages MS_1-MS_70 having no first character string as the second filtering group by sequentially checking whether the read messages MS_1-MS_70 have the first character string of the enabled one of the first predetermined triggering condition, and stores the contents of the second filtering group in the storage unit 11. In one embodiment, the plurality of messages includes at least one first message. When the at least one first message has a first character string of an enabled one of the plurality of first predetermined triggering conditions and has a first character string of another enabled one of the plurality of first predetermined triggering conditions, the at least one first message is included in the first filtering group. For example, both the first predetermined triggering condition TC1_1 and first predetermined triggering condition TC1_2 are enabled, not only the message(s) having the first character string CS1_1 and the message(s) having the first character string CS1_2, but also the message(s) having both the first character string CS1_1 and the first character string CS1_2 would be filtered out and displayed in the displaying screen of the computer server 10. In an applicable example, when both the first predetermined triggering condition TC1_1 and the first predetermined triggering condition TC1_2 are enabled, only the message(s) having both the first character string CS1_1 and the first character string CS1_2 would be displayed in the displaying screen of the computer server 10. In another applicable example, when the first predetermined triggering condition TC1_1 is enabled, the message(s) having the first character string CS1_1 is filtered out, and only the rest of messages is remained in the first filtering group and displayed in the displaying screen of the message displaying module 132 of the computer server 10 for observations.

Please refer back to the aforementioned example, as shown in FIG. 6, when the messages MS_15, MS_20 and MS_70 are extracted, the rest of messages MS_1-MS_14, MS_16-MS_19, MS_21-MS_69 would be grouped as the second filtering group 403. In other words, the contents of the second filtering group do not include the messages MS_15, MS_20 and MS_70. More specifically, the contents of the second filtering group 403 contain the message(s) that the relative technical members intend not to observe. Therefore, the contents of the second filtering group are stored in the storage unit 11 of the computer server 10 instead of being displayed in the displaying screen of the message displaying module 132 of the computer server 10. The relative technical members could retrieve the rest messages MS_1-MS_14, MS_16-MS_19, MS_21-MS_69 from the storage unit 11 of the computer server 10 if they would like to observe the rest messages afterwards. In one embodiment, when the computer server 10 determines that none of the plurality of first predetermined triggering conditions is enabled, then in step S209, the plurality of messages MS_1-MS_70 are all displayed in the displaying screen of the message displaying module 132 of the computer server 10.

In one embodiment, when at least one of the plurality of messages has the first character string of the enabled one of the first predetermined triggering conditions, a first filtering group and a second filtering group are formed. The contents of the first filtering group include a part of the plurality of messages. The part of the plurality of messages has the first character string of the enabled one of the plurality of first predetermined triggering conditions. The contents of the second filtering group include other ones of the plurality of messages not comprised in the contents of the first filtering group. The contents of the first filtering group would be displayed in the displaying screen of the message displaying module 132 of the computer server 10 and stored in the storage unit 11. The contents of the second filtering group would be stored in the storage unit 11. When none of the plurality of messages has the first character string of the enabled one of the first predetermined triggering conditions, the plurality of messages would be stored in the storage unit 11.

Figure 7:
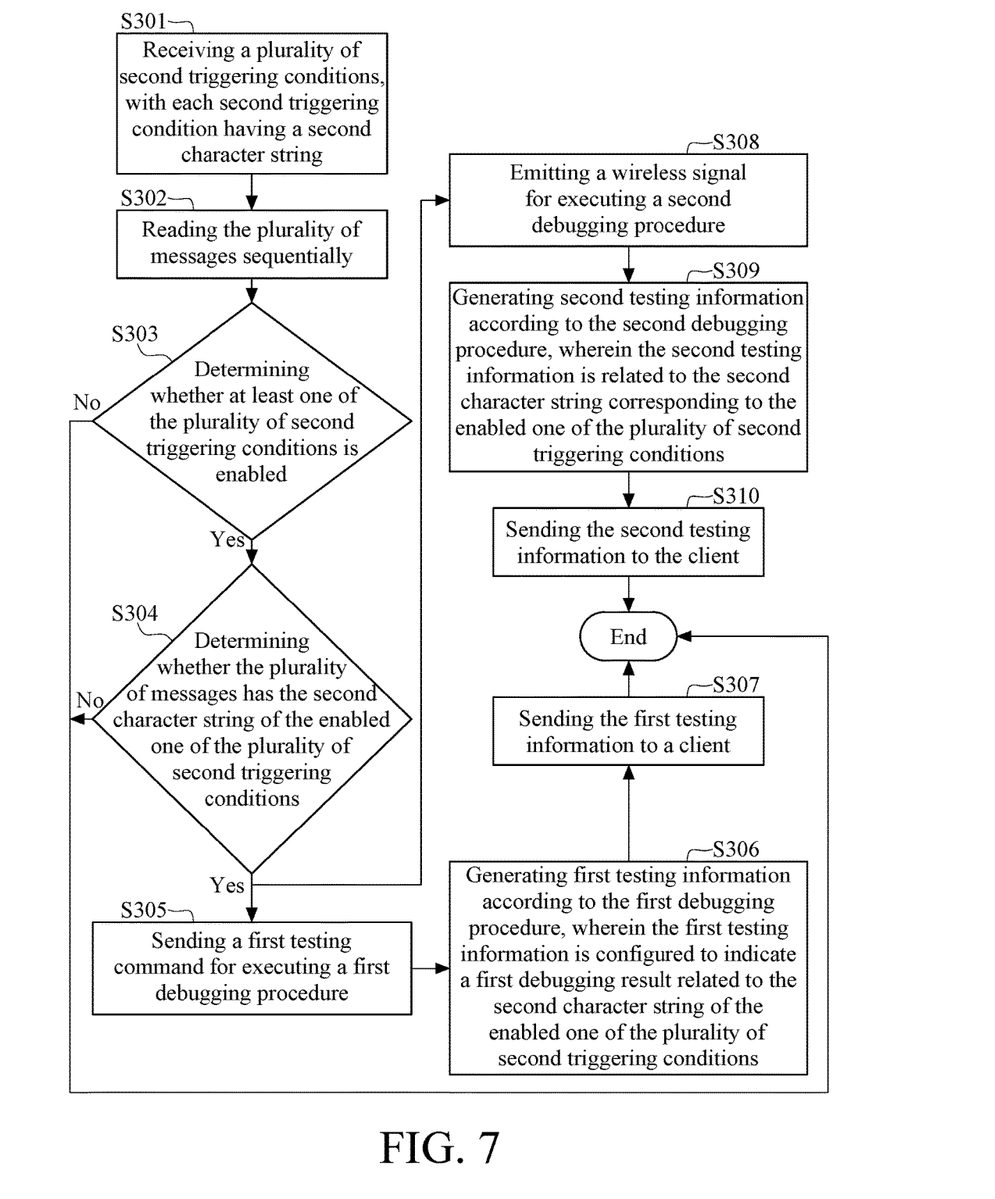
FIG. 7 is a flow chart of a method for message-processing according to another embodiment of the present disclosure.
Figure 8:
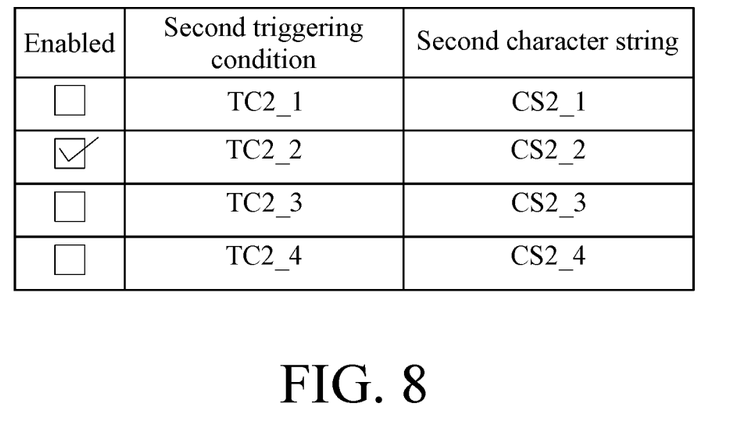
FIG. 8 is a schematic diagram of message setting window according to another embodiment of the present disclosure.

Please refer to FIG. 7 and FIG. 8. FIG. 7 is a flow chart of a method for message-processing according to another embodiment of the present disclosure. FIG. 8 is a schematic diagram of message setting window according to another embodiment of the present disclosure. As shown in FIG. 7 and FIG. 8, in step S301, a plurality of second predetermined triggering conditions TC2_1-TC2_4 are received by the message setting window. Each second predetermined triggering condition has a second character string. In this embodiment, the second predetermined triggering condition TC2_1 has a second character string CS_2_1, the second predetermined triggering condition TC2_2 has a second character string CS_2_2, the second predetermined triggering condition TC2_3 has a second character string CS_2_3 and the second predetermined triggering condition TC2_4 has a second character string CS_2_4. In embodiment, one of the second predetermined triggering conditions represents a status of internet disconnection of the subject device 15 and its second character string could be "network error". In step S302, the computer server 10 sequentially read the plurality of messages provided by the subject device 15. In step S303, the computer server 10 determines whether at least one of the plurality of second predetermined triggering conditions is enabled. In step S304, the computer server 10 further determines whether the plurality of messages has the second character string of the enabled one of the plurality of second predetermined triggering conditions. When the computer server 10 determines that at least one of the plurality of messages has the second character string of the enabled one of the plurality of second predetermined triggering conditions, the computer server 10 gives at least one first testing command through the first interface 20 in step S305. The at least one first testing command is configured to execute a first debugging procedure on subject device 15.

In a practical example, as shown FIG. 8, the second predetermined triggering condition TC2_4 is enabled. Assume that the second predetermined triggering condition TC2_4 represents a status of internet disconnection of the subject device 15 and its second character string CS2_2 is "network error". In the process of testing, when the internet disconnection happens on the subject device 15, the computer server 10 would find out message(s) having a character string among a plurality of messages sent back from the subject device 15. At this time, the computer server 10 automatically gives one or more first testing commands to execute a first debugging procedure for the status of internet disconnection of the subject device 15. In this example, the first debugging procedure is configured to perform a further testing and analysis for the status of internet disconnection, so that detailed reasons causing the internet disconnection of the subject device 15 could be found out. In practice, several detailed reasons may cause the internet disconnection of the subject device 15. For example, the subject device 15 is not connected to applications, or subject device 15 itself has an inner problem.

In the following step S306, the computer server 10 further generates first testing information according to the first debugging procedure. The first testing information is configured to indicate a first debugging result related to a second character string of the enabled one of the plurality of second predetermined triggering conditions. Specifically, the first testing information includes the first debugging result showing reasons of internet disconnection of subject device 15 found through the first debugging procedure. In step S307, the computer server 10 sends the first testing information to a client. In an example, the client is related to email accounts of relative technical members, the first testing information is sent to the email accounts of the relative technical members in the form of electric mails, so that the relative technical members could receive information or data related to debugging immediately. However, the present disclosure is not limited to the above embodiments. Therefore, in the process of testing, through the monitoring and auto-performed debugging procedure of the computer server 10, the relative technical members are still able to receive information related to debugging of the subject device 15 even though the relative technical members are not in the place where the subject device 15 is tested. Thereby, the efficiency and convenience of collecting messages are raised.

In one embodiment, as shown in FIG. 7, the method for message-processing further includes step S308. In step S308, when the computer server 10 determines at least one of the plurality of messages has the second character string of the enabled one of the second predetermined triggering conditions, the computer server 10 emits a wireless signal IR configured to execute a second debugging procedure. In one example, as shown in FIG. 2, the computer server 10 is equipped with a wireless signal emitter 12. When it is determined that one of the plurality of messages has the second character string of the enabled one of the second predetermined triggering conditions, the wireless signal emitter 12 of the computer server 10 emits a wireless signal IR toward the subject device 15 for executing a second debugging procedure on the subject device 15. In general, LCD TVs or audio systems are used in conjunction with one or more controllers having functions of wireless signal emitters. In this embodiment, the computer server 10 is equipped with the wireless signal emitter 12 to determine whether a LCD TV or an audio system has one or more bugs when users give some specific operation commands by performing simulations and tests. If the LCD TV or the audio system has one or more bugs, the one or more bugs would be fixed. In step S309, the computer server 10 generates second testing information according to the second debugging procedure. In step S310, the computer server 10 sends the second testing information to the client. Similar to the aforementioned embodiments, the second testing information is configured to indicate a second debugging result related to the second character string of the enabled one of the plurality of second predetermined triggering conditions. The specific operations regarding step S310 has been described in detail previously, so no more repeated here. In a practical example, the method for message-processing of the present disclosure may include the function of message filtering, and the functions of monitoring messages and debugging. The detailed descriptions about the specific operations of the practical example have been given in previous paragraphs, so no more repeated here.

Based on the above descriptions, in the method for message-processing of the present disclosure, messages related to the predetermined triggering condition enabled could be filtered out by received setting a plurality of predetermined triggering conditions, so that the relative technical members are able to observe specific messages. Therefore, the efficiency of reading messages is raised. Moreover, one or more debugging procedures could be automatically performed by monitoring the messages related to the predetermined triggering condition enabled, so that the efficiency of collecting debugging information is raised. Furthermore, the collected debugging information could be sent to the relative technical members immediately.

What is claimed is:

1. A method for message-processing adapted to a testing server and a device under test, with the testing server delivering a command to the device under test so that the device under test provides a plurality of messages and the testing server receives the plurality of messages through a first interface, the method comprising:
   receiving, by the testing server, a plurality of first predetermined triggering conditions of the messages and a plurality of second predetermined triggering conditions of the messages respectively set up by a client electrically connected to the testing server, with each first determined triggering condition having a first character string and each second determined triggering condition having a second character string, contents of the first character string and the second character string related to an operation item of the device under test;
   reading, by the testing server, the plurality of messages sequentially;
   determining, by the testing server, that at least one of the plurality of first predetermined triggering conditions is enabled and least one of the plurality of second predetermined triggering conditions is enabled respectively via the client;
   checking, by the testing server, that the plurality of messages has the first character string of an enabled one of the plurality of first predetermined triggering conditions for forming a first filtering group and displaying, on a display screen of the testing server, contents of the first filtering group, wherein the contents of the first filtering group comprises a part of the plurality of messages, and said part of the plurality of messages has the first character string of the enabled one of the plurality of first predetermined triggering conditions sequentially;
   determining, by the testing server, that the plurality of messages has the second character string of an enabled one of the plurality of second predetermined triggering conditions;
   sending, by the testing server, at least one first testing command for executing a first debugging procedure so that first testing information is generated when at least one of the plurality of messages has the second character string of the enabled one of the plurality of second predetermined triggering conditions, wherein the first testing information is configured to indicate a first debugging result related to the second character string corresponding to the enabled one of the plurality of second predetermined triggering conditions; and
   sending, by the testing server, the first testing information to the client.

2. The method for message-processing according to claim 1, further comprising:
   sending, by the testing server, the second testing information to the client.

3. The method for message-processing according to claim 1, further comprising:
   forming a second filtering group having contents comprising another part of the plurality of messages other than the part of the plurality of messages in the contents of the first filtering group; and
   storing the contents of the second filtering group to a memory of the testing server.

4. The method for message-processing according to claim 1, wherein the plurality of messages comprises at least one first message, the at least one first message is comprised in the first filtering group when the at least one first message has the first character string of the enabled one of the plurality of first predetermined triggering conditions and has the first character string of another one of the plurality of first predetermined triggering conditions, and said another one of the plurality of first predetermined triggering conditions is enabled.

5. The method for message-processing according to claim 1, further comprising:
   emitting a wireless signal for executing a second debugging procedure so that second testing information is generated when at least one of the plurality of messages has the second character string of the enabled one of the plurality of second predetermined triggering conditions, wherein the second testing information is related to the second character string of the enabled one of the plurality of second predetermined triggering conditions.

6. The method for message-processing according to claim 1, wherein the operation item of the device under test is a status of network connection between the testing server and the device under test.

* * * * *